March 3, 1953  E. J. BRADWAY  2,630,328
CHUCK
Filed March 2, 1951

INVENTOR
EDWARD J. BRADWAY
by
ATTORNEY

Patented Mar. 3, 1953

2,630,328

UNITED STATES PATENT OFFICE 2,630,328

CHUCK

Edward J. Bradway, Vineland, N. J., assignor to Armstrong Cork Company, Lancaster, Pa., a corporation of Pennsylvania Application March 2, 1951, Serial No. 213,530

2 Claims. (Cl. 279—50)

This invention relates to a chuck and more particularly to a lathe chuck for use in holding metal objects, such as mold parts, while the same are being turned to the proper configuration to adapt them for subsequent molding operations.

In the manufacture of mold elements for use in the production of articles such as glassware, it is necessary to perform the shaping operation on a lathe. This is a rather difficult operation, inasmuch as the turned surface is on the inside of the mold element being formed. In the past, these mold elements were held in position in a clamp type chuck in which the mold element was placed in the chuck and was held firmly therein by means of clamping bolts which were tightened, drawing the chuck firmly around the outer circumference of the mold element. This was a time-consuming operation, and furthermore, in an arrangement of this type, it was difficult to insure that the mold element was centered on the center line of the lathe. In order to insure that the mold element was in the center line of the lathe, it was necessary to tighten each of the clamping screws to the same degree. This was a very difficult operation, and many imperfect mold elements were made because of the fact that at least one of the turning operations was performed while the mold was not on the center line of the lathe.

In order to overcome the disadvantage of the prior art clamping type chuck described above, I have developed a pneumatic chuck which clamps the work piece firmly in the center of the chuck, applying uniform pressure around the entire circumference of the work piece, thereby assuring that the work piece will always be centered on the same center line when placed in the chuck.

An object of this invention is to provide a chuck which will always clamp the work piece on the same longitudinal central axis.

A further object of this invention is to provide a chuck in which the work piece may be clamped and removed rapidly without necessitating a great deal of down time on the lathe.

Figure 1:
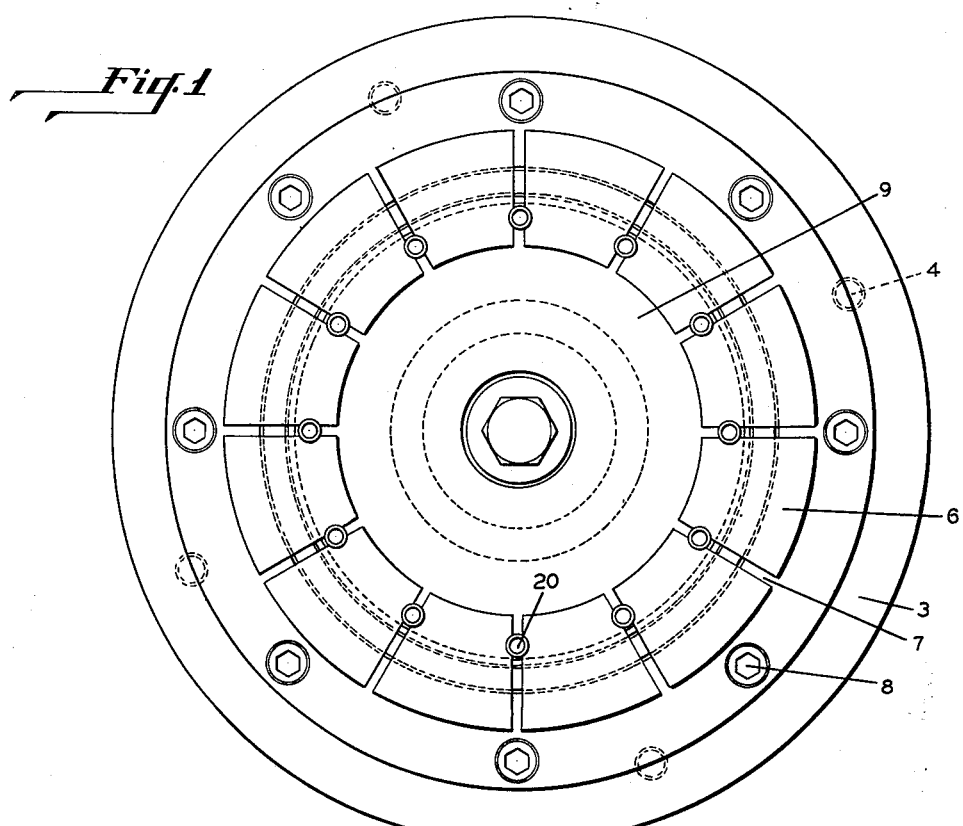
Figure 2:
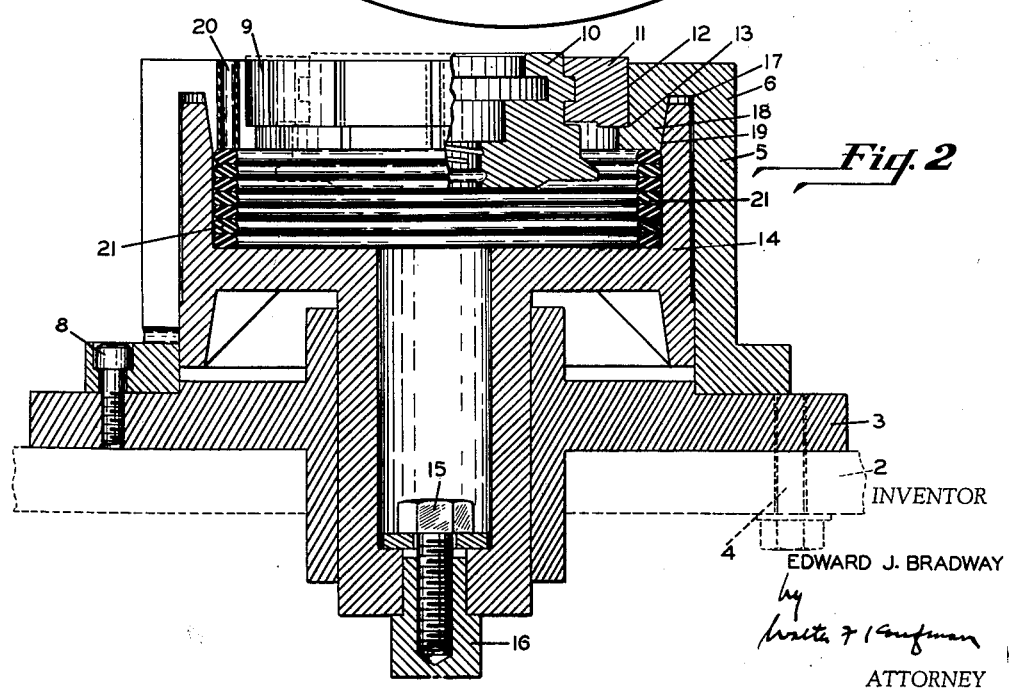

In order that my invention may be more readily understood, it will be described in connection with the attached drawing in which:

Figure 1 is a front elevational view looking into the chuck with the work piece removed; and Figure 2 is a cross sectional view of a chuck similar to the one shown in Figure 1 but showing a small portion of a work piece positioned therein.

Referring to the drawing, there is shown the face plate 2 of a conventional lathe. To this face plate 2 is secured a back-up plate 3, which is fastened to the face plate 2 by means of studs 4. This back-up plate 3 serves as a mount for the chuck 5. The chuck 5 is made up of a plurality of segments 6 having gaps 7 located therebetween. These segments are firmly attached to the back-up plate 3 by means of studs 8. The segments 6 are capable of a limited degree of flexing in an inward direction to firmly clamp a work piece placed within the opening 9 of the chuck.

Referring to Figure 2, there is shown a work piece 10 partially broken away. This work piece does not fill the entire opening 9 of the chuck, and a collet ring 11 is provided which surrounds the work piece and is formed in two hemispherical sections so that the ring 11 may be clamped between the chuck and the work piece as the chuck closes. It will be understood that for work pieces having differing outside dimensions, the collet ring 11 will have to be of a different size to fill the gap between the work piece and the chuck. The collet ring 11 has its inner circumference machined to fit the outer circumference of the work piece. Each segment of the chuck 5 has a collet retaining area 12 which insures that the collet ring will always be in the same position when placed in the chuck, inasmuch as it rests on the shoulder 13 on the inner circumference of the segments 6.

A sliding sleeve 14 is positioned inside the flexible chuck segments 6, said sleeve being capable of movement in a direction parallel to the longitudinal central axis of the chuck. This sleeve 14 is attached by means of a bolt 15 to a ram 16, which passes through the center of the face plate 2. This ram 16 is connected to an air cylinder (not shown) and the sleeve 14 is moved by means of the air cylinder.

Each segment 6 of the chuck 5 is U-shaped in cross-section forming a sleeve retaining recess 17 in which the sleeve slides. One inner surface of the recess 17 is provided with a cam surface 18 inclined in an outwardly direction, and the surface 19 of the sleeve in engagement with the cam surface 18 of the recess 17 has the same slope. As the sleeve 14 is moved forward by the air cylinder or other actuating means, the surface 19 of the sleeve sliding on the cam surface 18 of the recess will force all of the segments in a direction normal to the longitudinal center line of the chuck 5, clamping the collet ring 11 and the work piece firmly in the chuck. This movement of the sleeve 14 and the flexing of the segments 6 is very slight. The work piece and its complementary collet ring 11 are made to fit in the chuck, opening when the sleeve 14 is in its receded withdrawn position, and a very slight movement of the sleeve 14 in the forward direction flexes the segments sufficiently to clamp the assembly firmly in place.

Between the flexible segments 6 there are positioned resilient dirt seals 20 which extend to a circular dirt seal 21 in the back of the chuck. This prevents dirt from working in through the openings between the segments and getting into the interior of the chuck. The resilient nature of the seals 20 permits them to be slightly deformed when the chuck opens and closes without destroying their sealing properties.

In the operation of the device, the work piece is placed in the chuck opening with the collet ring 11 surrounding the same. With the work piece in this position, the air is turned on the air cylinder, forcing the ram 16 in a forward direction, carrying with it the sleeve 14. As the sleeve 14 moves forward, the surface 19 on the inner circumference of the sleeve 14 slides along the inclined cam surface 18 of the segments 6. This forward movement of the sleeve 14 causes the segments 6 to flex inwardly, clamping the work piece in position in the chuck. This clamping action continues so long as the pressure remains on the cylinder controlling the sleeve.

In order to remove the work piece from the chuck, the pressure on the cylinder is released and the sleeve is free to move toward the rear of the chuck. There is sufficient spring in the segments 6 to cause them to spring back to their original position, releasing the clamping action on the work piece and the same can be removed from the chuck.

It will be understood, of course, that while this invention has been described in connection with a pneumatic cylinder, the same may be used with any power source, such as a hydraulic cylinder or the like.

It will be clear from the above that I have developed an automatic chuck which may be rapidly operated and thereby greatly increase the efficiency and productivity of the machine to which the same is attached.

I claim:

1. A chuck, the elements comprising a plurality of flexible segments secured to a backing plate and arranged in circumferential relationship defining a work piece receiving recess, said segments being U-shaped in cross section, a cam surface on one of the inside surfaces of the U-shaped segments, a slidable sleeve positioned within the opening of the U-shaped segments, and a cam surface on the sleeve for cooperation with the cam surface on the segments, said sleeve being movable in a direction parallel to the longitudinal central axis of the chuck.

2. A chuck, the elements comprising a plurality of flexible segments secured to a backing plate and arranged in circumferential relationship defining a work piece receiving recess, said segments being U-shaped in cross section, a cam surface on one of the inside surfaces of the U-shaped segments, and means engageable with said cam surface to flex the segments inwardly to clamp the work piece in the recess defined by said segments.

EDWARD J. BRADWAY.

REFERENCES CITED

The following references are of record in the file of this patent:

UNITED STATES PATENTS

| Number | Name | Date |
|---|---|---|
| 815,877 | Taylor | Mar. 20, 1906 |
| 1,903,964 | Faust | Apr. 18, 1933 |
| 2,277,816 | Brown | Mar. 31, 1942 |

FOREIGN PATENTS

| Number | Country | Date |
|---|---|---|
| 474,962 | Great Britain | Nov. 10, 1937 |
| 482,766 | Great Britain | Apr. 5, 1938 |